(12) United States Patent
Voss

(10) Patent No.: US 6,400,599 B1
(45) Date of Patent: Jun. 4, 2002

(54) CACHE MEMORY CELL WITH A PRE-PROGRAMMED STATE

(75) Inventor: Peter H. Voss, Aromas, CA (US)

(73) Assignee: SandCraft, Inc., Santa Clara, CA (US)

( * ) Notice: Subject to any disclaimer, the term of this patent is extended or adjusted under 35 U.S.C. 154(b) by 0 days.

(21) Appl. No.: 09/569,543

(22) Filed: May 12, 2000

Related U.S. Application Data

(62) Division of application No. 08/982,822, filed on Dec. 2, 1997, now Pat. No. 6,070,229.

(51) Int. Cl.$^7$ .............................................. G11C 11/00
(52) U.S. Cl. ........................ 365/154; 365/104; 365/156
(58) Field of Search .................................. 365/154, 156, 365/104; 257/350, 351, 368, 369, 377, 393

(56) References Cited

U.S. PATENT DOCUMENTS

| | | | | |
|---|---|---|---|---|
| 4,510,584 A | * | 4/1985 | Dias et al. ............. | 365/185.08 |
| 4,538,246 A | * | 8/1985 | Wang et al. ........... | 365/185.08 |
| 4,638,465 A | * | 1/1987 | Rosini et al. ................ | 365/228 |
| 4,977,498 A | * | 12/1990 | Rastegar et al. ............ | 711/145 |
| 5,334,861 A | * | 8/1994 | Pfiester et al. ................ | 257/67 |
| 5,353,248 A | * | 10/1994 | Gupta ........................ | 365/154 |
| 5,584,014 A | * | 12/1996 | Nayfeh et al. .............. | 711/134 |
| 5,586,295 A | * | 12/1996 | Tran ........................... | 711/137 |
| 5,923,582 A | * | 7/1999 | Voss ........................... | 365/154 |

* cited by examiner

*Primary Examiner*—Hiep T. Nguyen
(74) *Attorney, Agent, or Firm*—Blakely, Sokoloff, Taylor & Zafman LLP

(57) ABSTRACT

A memory device including a first set of memory cells, a second set of memory cells having preprogrammed states, and a circuit configured to access data included in a first segment of memory cells. When data is read from the second set of memory cells the circuit includes an enable signal to determine whether the data outputted by the second set of memory cells is preprogrammed data or data stored during normal operation. For one embodiment, data read into or retrieved from the memory cells is performed in a consistent fashion between the first set of memory cells and the second set of memory cells.

3 Claims, 5 Drawing Sheets

CACHE MEMORY CELL WITH A PRE-PROGRAMMED STATE

This application is a divisional application of U.S. patent application Ser. No. 08/982,822, filed Dec. 2, 1997, now issued as U.S. Pat. No. 6,070,229.

BACKGROUND OF THE INVENTION

1. Field of the Invention

The present invention relates to memory circuits. More particularly, the present invention relates to a cache within a microprocessor configured to include memory cells with preprogrammed data.

2. Background

Improvements in microprocessor designs has lead to microprocessors with a high operating frequency. Current microprocessor designs exceed operating frequencies of 100 megahertz ("MHz"). However, the increase in operating frequency has not lead to excepted performance gains. One of the main components affecting performance gains is created by the microprocessor execution units idling during delays in external memory access. The delays in external memory access are caused by the inductive losses associated with off chip transmissions. The delays in external memory access are also caused by the conventional design characteristics of static random access memory ("SRAM") cells and dynamic random access memory ("DRAM") cells.

To counteract the performance losses associated with external memory access conventional microprocessor designs developed cache systems. The cache systems store copies of external data internal to the microprocessor, thus avoiding the performance loss created by accessing external memory. One disadvantage of the conventional cache system is that the cache systems requires consistent updating to ensure data coherency. Because the updating process requires access to external memory intermittent delay cycles still exists within the microprocessor.

FIG. 1 illustrates a prior art cache system. Processor 100 is coupled to external memory 120 via XBUS 130. Using XBUS 130, processor 100 is able to store and retrieve data from external memory 120. Processor 100 also includes cache 110. Cache 110 is used to store copies of data included in external memory 120, thus reducing processor 100 access to external memory 120. By reducing the frequency of access to external memory 120, processor 100 reduces idle cycles, thus increasing the throughput of executions within processor 100.

External memory 120 includes data 140 and data 150 located in non-adjacent address of external memory 120. For one embodiment data 140 and data 150 include fixed data that is used in many iterations of a sequence of instructions. That is, this fixed data is repeatedly used. The fixed data may include an instruction or executable data. During execution of the sequence of instructions, processor 100 must consistently update cache 110 with new data to ensure cache 100 and external memory 120 coherency. During this updating process a current copy of data 140 or data 150 within cache 110 may be flushed. However, because data 140 and data 150 are frequently used during execution of instructions, cache 110 must repeatedly access external memory 120 and re-copy data 140 or data 105 as required by the sequence of instruction. Accordingly, frequent access to external memory 120 to update cache 110 reduces the performance gains of including a cache within a processor 100.

Some processors use a write back cache to counteract the performance loss of consistent cache updating. A write back cache delays time intensive memory updates by storing new data within the cache for a given time period prior to external memory updates. However, write back caches require a complicated controller to track data between the cache and main memory. Further, write back caches are unable to store repetitive data or instruction sequences permanently. Accordingly, write back caches do not provide any performance gains for processors that execute a particular code consistently. Therefore, what is needed is a cache wherein a segment of memory cells are configurable to store pre-programmed data. Also, what is needed is to have the segment of memory cells operate as typical memory cells when the pre-programmed data is not required. While some prior systems have allowed a segment of memory cells to operate as read-only memory or as random access memory, these prior systems typically require careful control of transistor sizes in designing a memory cell.

SUMMARY OF THE INVENTION

In one embodiment, the present invention concerns a cache including a plurality of first and second memory cells, an addressing circuit, an enable circuit, and an output circuit. The second memory cells are configured to store data in a first mode and a second mode. The first mode involves a normal operation wherein the first and second memory cells store and retrieve data similarly. The second mode involves the retrieval of preprogrammed data within the second memory cells. When cache data is accessed, the addressing circuit selects a segment of the cache based on address inputs. Using the output circuit the cache stores or retrieves data from the selected segment of the cache. Dependent on the distribution of memory cells, a given selected segment includes first memory cells and/or second memory cells.

For one embodiment, the enable circuit uses predetermined addresses to determine whether second memory cells within a selected segment of the cache are in first mode or second mode. For alternative embodiments, the enable circuit uses a separate enable signal to determine whether second memory cells within a selected segment of the cache are in first mode or said mode.

Other features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

A cache system with a segment of the cache including preprogrammed memory cells is disclosed. The preprogrammed memory cells store and retrieve data using the storage and retrieval methods of other cells within the cache. Typically these methods allow data to be changed within each cell. However, the preprogrammed memory cells also include preprogrammed data. Accordingly, the preprogrammed memory cells can retrieve a stored value (which may be changed) or retrieve the preprogrammed data. For an alternative embodiment, an enable signal is used in conjunction with a word line, to retrieve preprogrammed data from the cache system. Accessing, a segment of data within the cache is determined via memory addresses selected by execution units within the processor in one embodiment where the cache is included within a processor. Accordingly, for an alternative embodiment, a predetermined matched address is used to trigger retrieval of preprogrammed data within the cache by providing the enable signal for a selected cell or cells.

The preprogrammed memory cell follow the design of other memory cells within the cache system. Accordingly, the area of the cache is not significantly increased. Further, circuits typically used with non-preprogrammed memory cells, such as sense amplifier and column decoders, can be used with the preprogrammed memory cells.

An intended advantage of an embodiment of the present invention is to provide a storage device for storing recurrently accessed external memory data. The storage device includes preprogrammed memory cells within a cache system. Placing the preprogrammed memory cells in a cache system provides the microprocessor's execution units with immediate access to the recurrent data. For one embodiment, the preprogrammed memory cells are designed to operate concurrently with other memory cells in the cache.

Another intended advantage of an embodiment of the present invention is to reduce access to external memory. Because accessing external memory dramatically effects the microprocessor's performance, the present invention places recurrently accessed data in a cache system. The localized data storage reduces the microprocessor's access to external memory.

Another intended advantage of an embodiment of the present invention is to provide for a permanent cache storage without affecting the performance of the cache. For one embodiment, the preprogrammed memory cells store and retrieve data which may be modified while maintaining their preprogrammed states. Accordingly, the storage ability of the cache is unaffected even though segments of the cache are used to store fixed data. The fixed data is retrieved when predetermined addresses are selected by an agent's request for information.

Figure 1:
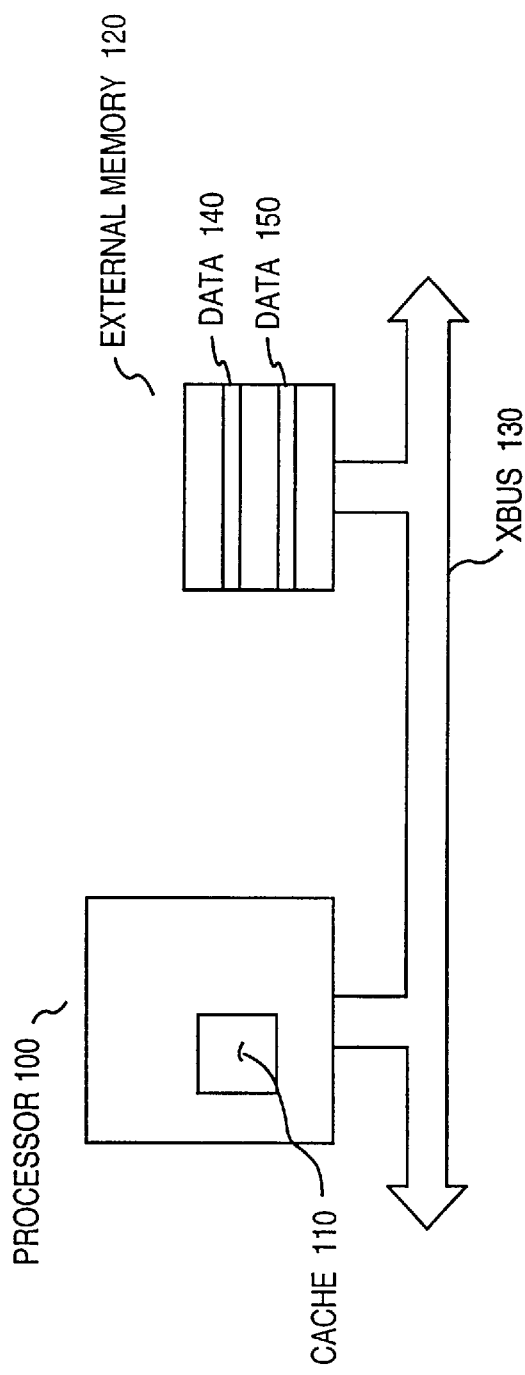
FIG. 1 shows one embodiment of a prior art cache system within a processor.
Figure 2:
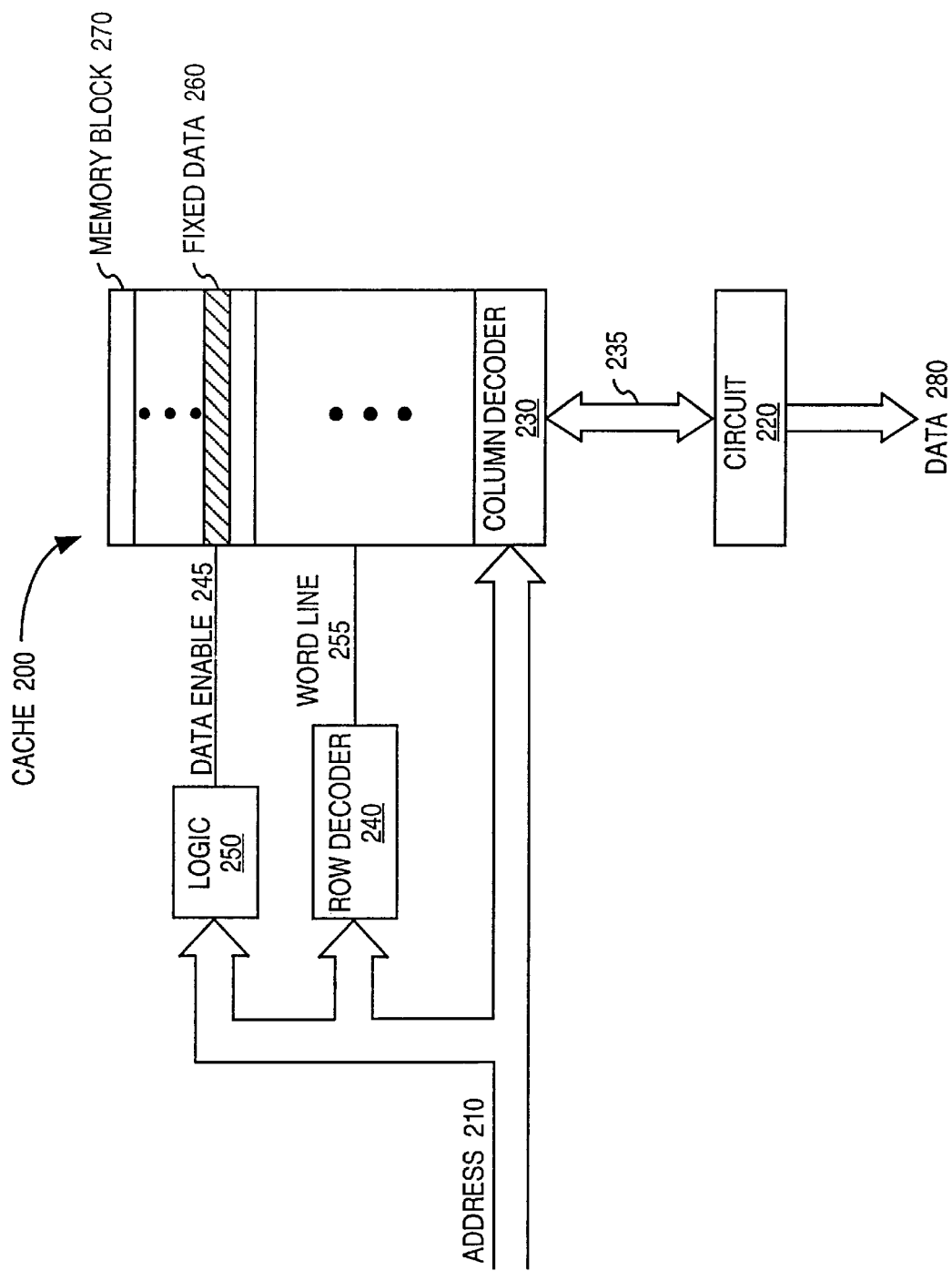
FIG. 2 shows one embodiment of a cache with a fixed data segment.

FIG. 2 shows a block diagram of one embodiment of cache 200 configured in accordance with the present invention. Cache 200 includes a plurality of memory block 270s, a column decoder 230, a row decoder 240, logic 250, and circuit 220. Each memory block 270 includes a plurality of memory cells. For one embodiment, a memory block 270 may be selected or addressed by supplying an address along address 210 to row decoder 240 and column decoder 230. In particular, for a given address, row decoder 240 selects a word line within cache 200. For the same word line column decoder 230 may select bit lines for addressed memory cells within the word line. Data from bus data 280 may then be read from or written to the selected bit lines via circuit 220.

Cache 200 also includes fixed data 260. For one embodiment, fixed data 260 includes a memory block comprising preprogrammed memory cells (not shown). Each preprogrammed memory cell includes a predetermined state or operates as a non-preprogrammed memory cell dependent on a signal, data enable 245. Data enable 245 is coupled to logic 250. For one embodiment a predetermined address along address 210 causes logic block 250 to set data enable 245 to an active high. Accordingly, all addressed preprogrammed memory cells coupled to data enable 245 output their preprogrammed state values along bus 235 in response to an active high signal on data enable 245. This results in sense amp 220 outputting the preprogrammed states along data 280. For an alternative embodiment, a different enabling signal coupled to an external pin is inputted to logic 250 to set data enable 245 to an active high. In yet another embodiment, an enable signal is generated internally by a microprocessor including cache 200; the microprocessor may be programmed or hardwired to cause the enable signal to be generated whenever predetermined addresses are requested by a requester, such as a program or an external device.

Figure 3:
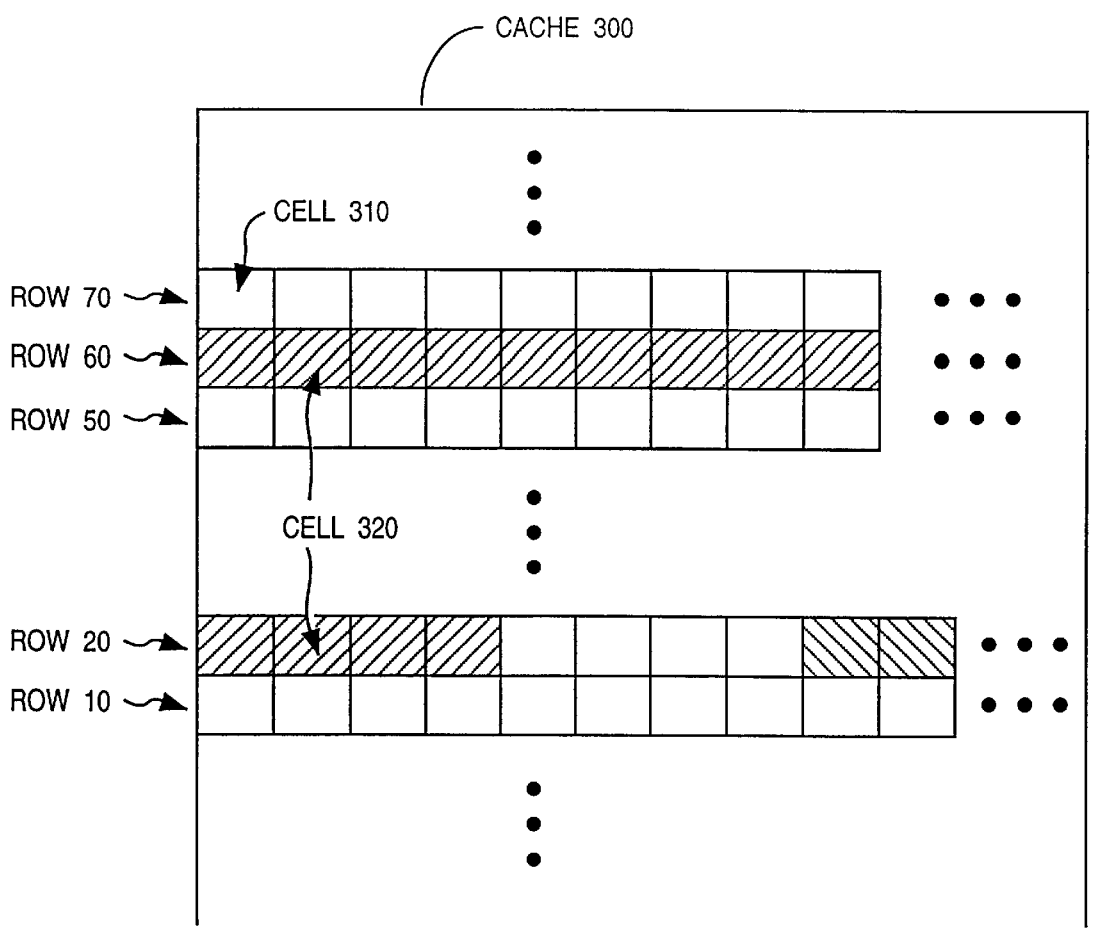
FIG. 3 shows one embodiment of cache cells with different memory cell structures.

FIG. 3 shows a memory cell organization within cache 300 for one embodiment of the present invention. Cache 300 includes 256 rows of memory cells. For one embodiment, cache 300 includes two types of memory cells, cell 310 and cell 320. Both cell 310 and cell 320 may operate as volatile memory cells which may be written to or read from, however cell 320 includes a preprogrammed memory state. Because cell 320 operates as both a volatile memory cell and a preprogrammed memory cell, the memory space available within cache 300 is not affected by the placement of cell 320. Additionally, the same detection circuit (not shown) is used to determine the stored value in cells 310 and 320. Accordingly, the. intermixing of cells 310 and cells 320 within cache 300 does not significantly affect the design of a processor including cache 300 or the design of a separate cache (e.g. level 2 cache).

As illustrated in FIG. 3, row 60 and row 20 include cell 320. For one embodiment, during the operation of cache 300 when row 60 is accessed a row of preprogrammed data is available; Similarly, when row 20 is accessed one half of the outputted data may include preprogrammed values. For an alternative embodiment, a group of four cells comprise a memory block. Accordingly, row 20 includes alternating memory blocks, wherein ever other memory block includes preprogrammed data values. In yet another embodiment, a plurality of adjacent rows all include cell 320. Thus, providing a contiguous segment of a cache with preprogrammed data values.

Figure 4:
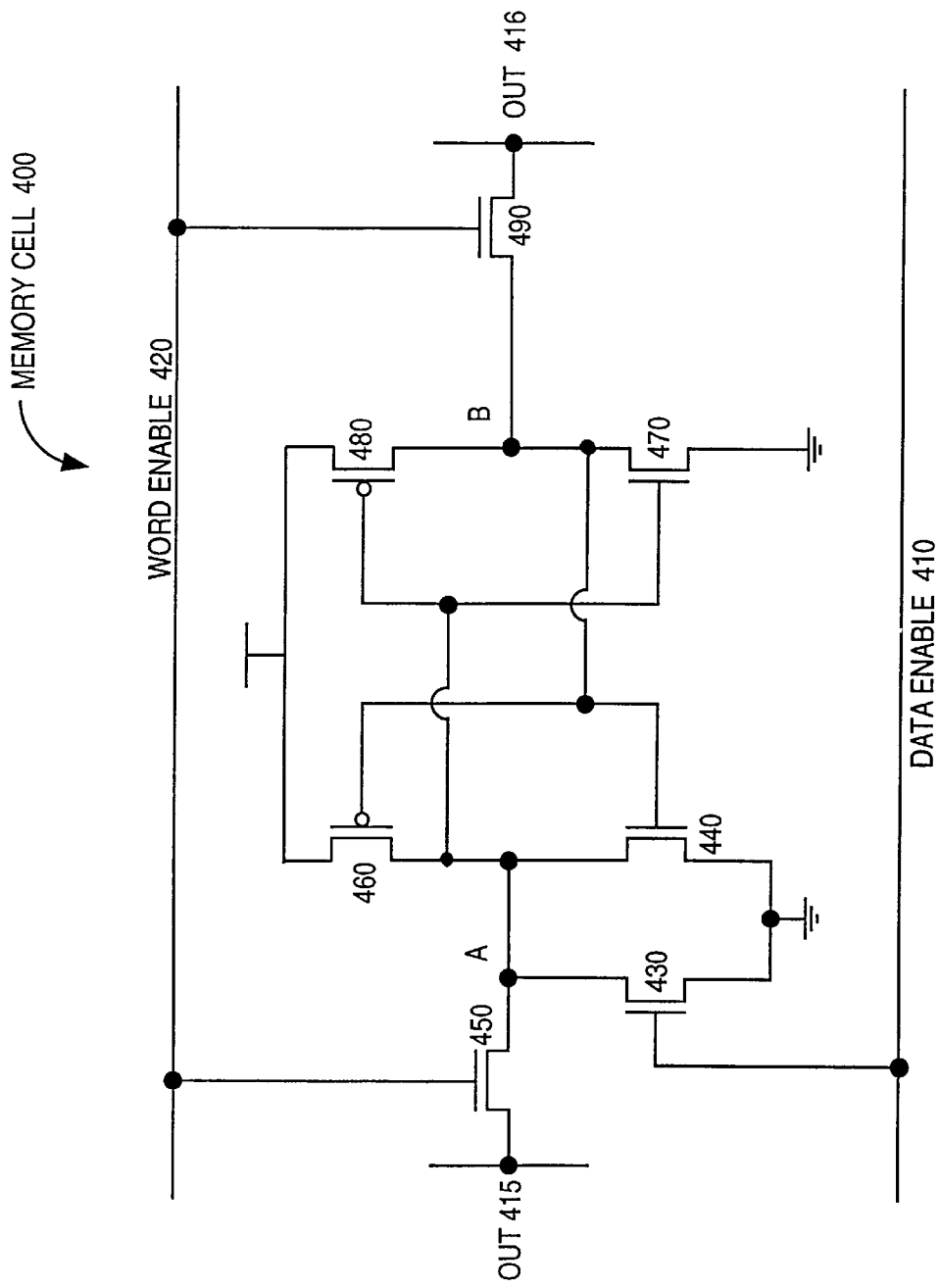
FIG. 4 shows one embodiment of a preprogrammed memory cell.

FIG. 4 illustrates cell 320 for one embodiment of the present invention. Memory cell 400 includes PMOS transistor 480 coupled to NMOS transistors 470 and 490. The source of PMOS transistor 480 is coupled to a power supply while the drain of PMOS transistor 480 is coupled to the source of NMOS transistor 490. The source of NMOS transistor 470 is coupled to ground while the drain of NMOS transistor 490 is coupled to out 416.

Memory cell 400 also includes PMOS transistor 460 coupled to NMOS transistors 430, 440, and 450. The source of PMOS transistor 460 is coupled to a power supply while the drain of PMOS transistor 460 is coupled to the source of NMOS transistor 450. The source of NMOS transistors 430 and 490 are coupled to ground while the drain of NMOS transistor 450 is coupled to out 415. The gates of NMOS transistor 440, NMOS transistor 470, PMOS transistor 460, and PMOS transistor 480 are cross-coupled. In particular, the gates of NMOS transistor 470 and PMOS transistor 480 are coupled to the drain of PMOS transistor 460, which is the output of the inverter formed by transistors 460 and 440. Similarly, the gates of NMOS transistor 440 and PMOS transistor 460 are coupled to the drain of PMOS transistor 480, which is the output of the inverter formed by transistors 470 and 480. The cross-coupling structure creates complimentary logic states and allows memory cell 400 to act as a bi-stable static storage device with two storage nodes. For an alternative embodiment, memory cell 400 comprises a dynamic storage device wherein the values included in storage nodes are refreshed for a given clock cycle. In another alternative embodiment, the memory cell 400 comprises a readable and writeable storage cell which is non-volatile, such as a flash memory cell which also includes a circuit which provides a preprogrammed state.

The storage nodes of memory cell 400 are denoted as nodes A and B. Using word enable 420, which is coupled to the gate of NMOS transistors 450 and 490, a bit value may be stored or retrieved from nodes A and B via out 415 and out 416. It will be appreciated that out 415 and out 416 may be complimentary bit lines which form a column in the memory array and are coupled to memory cells in the same column but other rows. These outputs are coupled to a conventional sensor amplifier to read the data in a memory cell (when reading) and to drivers to write data to the memory cell (when writing). Additionally, the memory cell 400 may be operated in a read-only mode where the preprogrammed data is read. This is done by activating the data enable line (driving it high) to turn on transistor 430. Toggling data enable 410, which is coupled to the gate of NMOS transistor 430, provides for a preprogrammed logic value of "0" at node A and a preprogrammed logic value of "1" at node B. Accordingly, data enable 410 and NMOS transistor 430 provide for an enable circuit, wherein memory cell 400 may be used to store preprogrammed values and output the preprogrammed values along out 415 and out 416. Data enable 410 and NMOS transistor 430 provide for an enable circuit that does not vary the storage and retrieval capacity of memory cell 400. For one embodiment, the channel length and width of NMOS transistor 430 is minimized so that a cache including an array of a plurality of memory cell 400s does not significantly increase in area.

Figure 5:
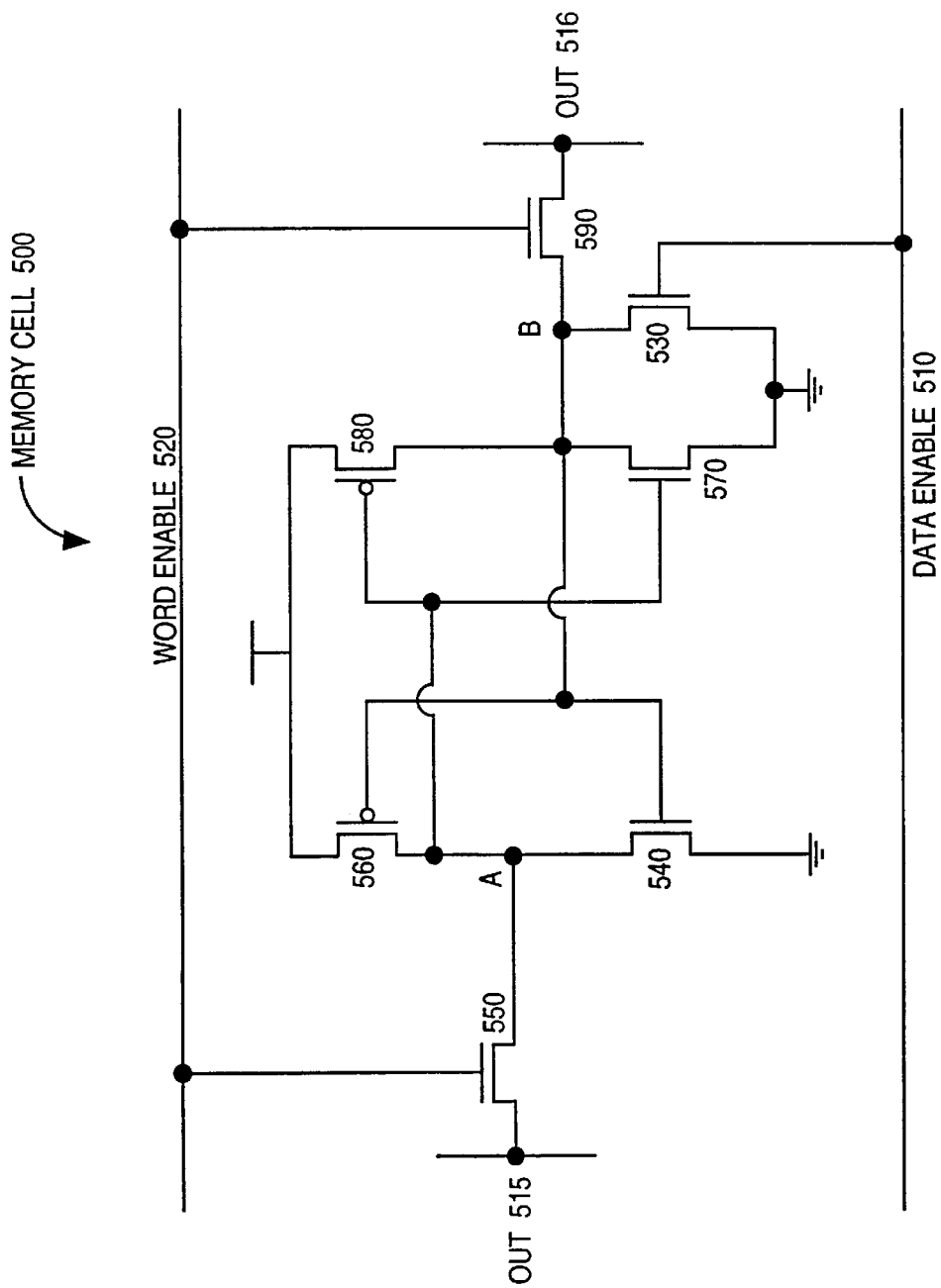
FIG. 5 shows one embodiment of a preprogrammed memory cell.

FIG. 5 illustrates cell 320 for an alternative embodiment of the present invention wherein the preprogrammed values of nodes A and B are the compliments of memory cell 400. Memory cell 500 includes PMOS transistor 560 coupled to NMOS transistors 540 and 550. The source of PMOS transistor 560 is coupled to a power supply while the drain of PMOS transistor 560 is coupled to the source of NMOS transistor 550. The source of NMOS transistor 540 is coupled to ground while the drain of NMOS transistor 550 is coupled to out 515.

Memory cell 500 also includes PMOS transistor 580 coupled to NMOS transistors 530, 570, and 590. The source of PMOS transistor 580 is coupled to a power supply while the drain of PMOS transistor 580 is coupled to the source of NMOS transistor 590. The source of NMOS transistors 530 and 570 are coupled to ground while the drain of NMOS transistor 590 is coupled to out 516. The gates of NMOS transistor 540, NMOS transistor 570, PMOS transistor 560, and PMOS transistor 580 are cross-coupled. In particular, the gates of NMOS transistor 570 and PMOS transistor 580 are coupled to the drain of PMOS transistor 560. Similarly, the gates of NMOS transistor 540 and PMOS transistor 560 are coupled to the drain of PMOS transistor 580. The cross-coupling structure creates complimentary logic states and allows memory cell 500 to act as a bi-stable static storage device with two storage nodes. For an alternative embodiment, memory cell 500 comprises a dynamic storage device wherein the values included in storage nodes are refreshed for a given clock cycle. In another alternative embodiment, the memory cell 500 comprises a readable and writeable storage cell which is non-volatile, such as a flash memory cell which also includes a circuit which provides a preprogrammed state.

The storage nodes of memory cell 500 are denoted as nodes A and B. Using word enable 520, which is coupled to the gate of NMOS transistors 550 and 590, a bit value may be stored or retrieved from nodes A and B via out 515 and out 516. Additionally, toggling data enable 510 (by driving it high in this embodiment), which is coupled to the gate of NMOS transistor 530, provides for a preprogrammed logic value of "0" at node B and a preprogrammed logic value of "1" at node A. Accordingly, data enable 510 and NMOS transistor 530 provide for an enable circuit, wherein memory cell 500 may be used to store preprogrammed values and output the preprogrammed values along out 515 and out 516. Data enable 510 and NMOS transistor 430 provide for an enable circuit that does not vary the storage and retrieval capacity of memory cell 500. For one embodiment, the channel length and width of NMOS transistor 530 is minimized so that a cache including a plurality of memory cell 500s does not significantly increase in area.

While memory cell 400 and memory cell 500 have been illustrated as seven transistor cells, other cell configurations may also be used and modified to be preprogrammed into a preferred state. For one embodiment, memory cells wherein resistive loads are used to preprogram storage nodes may be used.

Embodiments of the present invention have been described according to cache 300. However, the present invention may be practiced in multi-port random access memory ("RAM") devices or level two ("L2") caches which are typically coupled directly to the external bus of a host processor. The present memory cells may also be used in RAM memories that are stand alone chips or are incorporated into other integrated circuits such as embedded controllers.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A memory cell comprising:

a first CMOS inverter having an NMOS transistor and a PMOS transistor;

a second CMOS inverter cross-coupled to the first CMOS inverter;

a first transistor having a gate, a source, and a drain, wherein the source is coupled to output of said first CMOS inverter, the gate is coupled to a first signal, and the drain is coupled to a first out;

a second transistor having a gate, a source, and a drain, wherein the source is coupled to output of second CMOS inverter, the gate is coupled to the first signal, and the drain is coupled to a second out; and a circuit coupled to the output of the first CMOS inverter, wherein the circuit stores a first preprogrammed value in the memory cell.

2. The memory cell of claim 1, wherein the circuit is coupled to the output of the second CMOS inverter and stores a second preprogrammed value in the memory cell.

3. The memory cell of claim 1, wherein the circuit comprises a NMOS transistor having a gate coupled to a second signal, a drain coupled to ground, and a source coupled to the output of the first CMOS.

* * * * *